UNITED STATES PATENT OFFICE.

JOHN JANN, OF NEW WINDSOR, MARYLAND.

IMPROVED BURNING-FLUID.

Specification forming part of Letters Patent No. 52,574, dated February 13, 1866.

*To all whom it may concern:*

Be it known that I, JOHN JANN, of New Windsor, in the county of Carroll and State of Maryland, have made a new and useful Improvement in Burning-Fluid; and I do hereby declare the following to be a full, clear, and exact description of the nature and composition of the same sufficient to enable one skilled in compounding such fluids to make and use the same.

My improvement consists in mixing with benzine or its allied fluids a quantity of sweet and linseed oil, by which the dangerous explosive character of the benzine is removed and the fluid becomes a safe, economical, and effective illuminating material.

To one gallon of the ordinary benzine I add half a pint of sweet oil and one-quarter of a pint of linseed-oil, and shake the mixture. After the ingredients are intimately mixed it will be found that the explosive character of the benzine has been so far modified and neutralized that it may be safely and economically used in lamps with or without a chimney.

I am aware that oleine and fatty matters have been before mingled with benzine; but I have discovered that sweet oil is particularly appropriate and effective for this purpose, and that the linseed-oil, by gumming the wick, partially retards the passage of the fluid and aids the result.

I believe the burning-fluid thus compounded to be superior to any oil now in use, and attribute its value to the choice of oil—namely, the sweet and linseed oils—which I have found to answer a better purpose than any among the numerous fatty matters and mineral expressed and essential oils which I have tried in this connection.

Having described my invention, what I claim therein as new, and desire to secure by Letters Patent, is—

The combination of benzine, sweet and linseed oil in about the proportions mentioned.

To the above specification I have signed my hand this 21st of December, 1865.

JOHN JANN.

Witnesses:
C. D. SMITH,
JAS. L. EWIN.